…

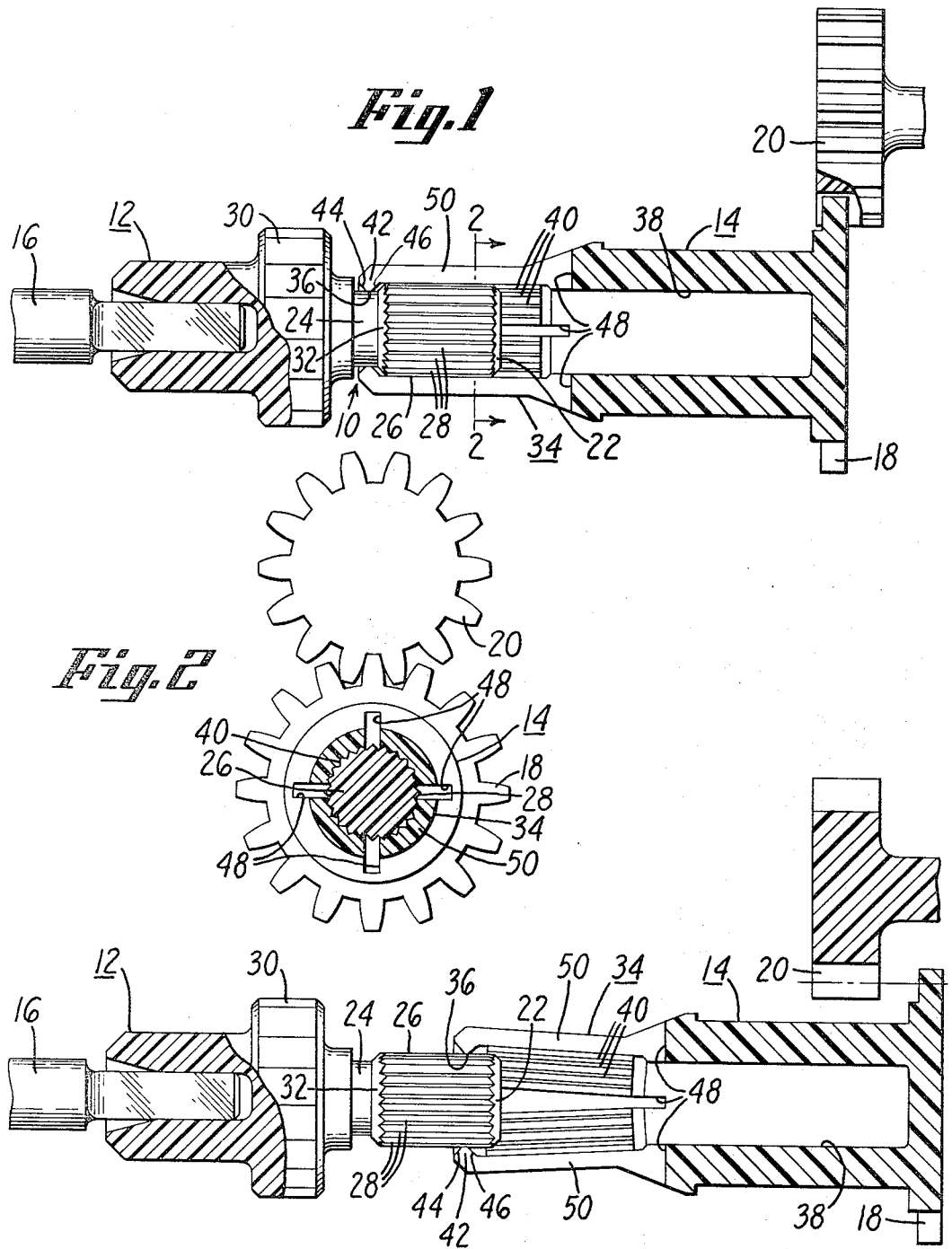

United States Patent Office 3,335,580
Patented Aug. 15, 1967

3,335,580
ARCUATELY INDEXABLE ROTARY DRIVE
CONNECTOR
Richard H. Simpson, Jr., Flint, Mich., assignor to General
Motors Corporation, Detroit, Mich., a corporation of
Delaware
Filed Oct. 22, 1965, Ser. No. 501,992
10 Claims. (Cl. 64—24)

ABSTRACT OF THE DISCLOSURE

A slip coupling is provided to adjust the angular relationship of two units connected by a flexible shaft. One part of the coupling has radially expandable outer splines normally mating with inner splines formed on the other part of the coupling. The two coupling parts may be snapped together with the splines engaging to establish the desired angular relationship. The outer splines are expandable by camming action when sufficient torque is exerted between the two coupling parts, this torque being greater than that encountered during normal operation of the two units connected through the coupling.

---

The invention relates to a connector and more particularly to one for connecting two rotatable members in rotary driving, axially retained, and arcuately indexable relation. The connector or joint embodying the invention permits the snap connection of a first shaft and a second shaft and permits the arcuate indexing of one shaft relative to the other without axially disconnecting the two shafts.

Mechanism embodying the invention is particularly useful in installations requiring a particular arcuate relationship between a drive member and a driven member. Such installations may be found in controls for various instruments, for example, wherein the instrument is set through a rotatable shaft. When the rotatable shaft is a flexible cable which is removable, it becomes even more important to be able to arcuately index the input end of the shaft with the output end of the shaft. It may also be used in a push-pull arrangement, then being so designed that the disconnecting force requirement is substantially greater than the operating force requirement.

Prior constructions have commonly utilized a threaded connector on the end of a flexible drive cable of the type used to connect a speedometer cable to a speedometer, for example. While this provides a satisfactory driving connection and axial retention, it does not permit arcuate indexing. Such indexing is particularly important when a rotatable cable controls manual input control for a vehicle road speed control system, for example, wherein the set or desired speed at which the vehicle is to travel is determined by the arcuate position set through the flexible cable and its connection to the speed control instrument.

Mechanism embodying the invention utilizes radially expandable outer splines or serrations or teeth normally mating with inner splines or serations or teeth. For simplicity they are hereinafter referred to only as splines. The outer splines are expandable by camming action of the splines when a sufficient torque is exerted between the two joint members. This torque is greater than that encountered during normal operation of the shafts connected by the joint. It is preferable to have the splines so constructed that they will cam the outer splines radially outward when the indexing torque is exerted in either direction between the joint members, although in some installations it may be desirable to so form the splines that they will cam outwardly when the torque is exerted in one direction but not when the torque is exerted in the other direction. In such installations, the driving torque normally would be exerted in the non-camming direction, and the indexing torque would be exerted in the opposite direction. A joint embodying the invention also has detention means which is provided with cam surfaces permitting the snap engagement and disengagement of the splines and acting to hold the members being joined in a predetermined axial relation. The detent means in some instances is constructed to permit slight axial relative movement of the members without interfering with the rotary driving relation thereof or the circumferential indexing capabilities.

In its preferred form the driving member has a groove spaced from one end which acts as a part of the detent means and defining, with the end of the drive member, a land having a series of circumferentially equi-spaced splines extending parallel to the axis of the drive member. The driven member has a cylindrically formed section the inner wall of which has mating splines formed thereon which mate with the splines of the drive member when the joint is connected. The cylindrical portion of the driven member is preferably provided with a plurality of slots extending longitudinally through the entire splined area thereof and somewhat beyond so that this portion of the driven member is formed to provide a plurality of cantilever spring fingers. These fingers are sufficiently flexible to be movable outwardly by camming action of the splines so that the driven member splines can pass arcuately over the drive member splines and will snap into position in an arcuate indexed relation. It is usually desirable to provide a detent construction on the outer end of the driven member cylindrical section which can extend into the groove of the drive member so as to hold the drive and driven members in a predetermined axial relation. The detent and the side of the groove adjacent the splines cooperate to provide detent means and are preferably sloped to provide cam surfaces which cause the outer ends of the spring fingers to be moved radially outwardly upon sufficient axial tension force being exerted between the drive and driven members, and thereby permit disconnection of the joint. Similarly the end of the drive member where the splines terminate is provided with a beveled or sloping surfaces, as is the outer side of the detent of the driven member, so that the fingers may be expanded by pushing the drive member into the driven member. With the splines in proper mating alignment, this will permit the connection of the joint.

In the drawings:

FIGURE 1 is an elevation view of mechanism embodying the invention with parts broken away and in section and showing the connector or joint in its engaged position.

FIGURE 2 is a cross section view of the mechanism of FIGURE 1 taken in the direction of arrows 2—2 of that figure.

FIGURE 3 is a view similar to FIGURE 1 but showing the connector or joint in the process of either connection or disconnection.

The connector or joint 10 of the mechanism includes a drive member 12 and a driven member 14. The drive member is illustrated as being connected with the core 16 of a flexible cable. The driven member is illustrated as having a spur gear 18 which is in engagement with another gear 20. It is to be understood that other types of connection may be made to the drive and driven members. The drive member has an end 22 with a circumferentially extending groove 24 formed in the drive member in axially spaced relation from the end 22. Thus the groove 24 and the end 22 are separated by a land 26. Splines 28 are formed on land 26. They extend longitudinally of the drive member and are parallel to the axis of rotation thereof. The drive member 12 may also be provided with a knurled nut-like beveled section 30 which may be utilized to exert indexing torque thereon in a manner described below. The side of groove 24 adjacent the splines 28 is beveled or sloped as shown at 32, as is the end 22.

The driven member 14 has a cylindrically formed section 34 with an open end 36. The section may be cylindrically formed by providing a bore or recess 38. The recess 38 preferably extends inwardly beyond the cylindrically formed section 34. The cylindrically formed section 34 has internal splines 40 formed thereon which are arranged so that they are capable of mating with splines 28 in rotary driving and arcuate indexing relation. The open end 36 of the cylindrically formed section has an inwardly formed detent 42 thereon. Detent 42 is provided with beveled or sloping surfaces 44 and 46 so that they may respectively cooperate with the beveled surface of end 22 and the beveled side 32 of groove 24 during the axial connection and disconnection of the coupling or connector. Groove 24 and detent 42 extend radially inwardly of the drive member a sufficient distance to provide for the engagement of the detent 42 against one or both of the groove sides to locate the joint elements in axial connecting relation.

The cylindrically formed section 34 is provided with a plurality of longitudinally extending slots 48. These slots begin at the open end 36 of the section and extend beyond the inner ends of the splines 40. Four such slots are shown, although any number of slots may be provided as desirable. The slots 48 divide the cylindrically formed section 34 into a plurality of circumferentially spaced cantilever spring fingers 50, each finger of which has at least one spline 40 on the inner wall thereof. The fingers are integrally joined to the main body of the driven member 14 at the terminal points of the slots 48. The main body of the driven member 14 may also be provided with suitable gripping surfaces to exert the required indexing torque thereon.

Considering FIGURE 3 to show the process of connecting the joint, it can be seen that the end 22 of the drive member is brought into engagement with the cam surface 44 and the detent 42 and sufficient compressive axial force is exerted between the members 12 and 14 to cause the detent to cam outwardly, expanding the fingers 50 radially outwardly so that the detent rides over the splines 28. As the joint members 12 and 14 are pushed together, the detent snaps into the groove 24 and the splines 28 and 40 are aligned and mated in rotary drive and arcuate indexing relation. The detent 42 may have substantially the same width as the groove 24 if it is desired to allow little or no relative axial movement of the drive and driven members, or the detent may have a somewhat less width than the groove 24 to provide some clearance therebetween, as shown in FIGURE 1, and thereby permit minor axial adjustments of the drive member and driven member.

When it is desired to disconnect the coupling, a sufficient tension axial force is exerted between the drive and driven members to cause the cam surface 46 of the detent to ride radially outwardly on the cam or beveled surface 32, thereby again spreading the fingers 50 and permitting the removal of the detent over the splines 28.

Arcuate indexing of the drive and driven members is obtainable with the joint in the connected position shown in FIGURE 1. This is accomplished by exerting sufficient torque between the drive and driven members. The torque may be exerted through the knurled or beveled surface 30 of the drive member 12 and a similar surface on the main body of the driven member 14, for example. The splines 28 and 40 are so constructed that when sufficient rotary torque is exerted by the drive and driven members, the splines 28 act as camming means on splines 40 to expand the fingers 50 radially. The drive member is then rotated relative to the driven member until the splines 40 of the fingers 50 snap into engagement in the next adjacent opening between the splines 28. This may be repeated as necessary until the desired indexed position is obtained. It can thus be seen that, with the splines 28 being arranged in circumferentially equi-spaced relation on the land 26, and with the splines 40 being made in mating relation thereto, the number of indexing points obtainable is defined by the number of splines 28. Since the slots 48 remove a part of the splines 40 there will not normally be as many splines 40 as there are splines 28. However, the splines that are provided on the fingers 50 are spaced circumferentially in the same manner as are the splines 28.

A connector or joint or coupling has therefore been disclosed which will permit the snap axial retention and disconnection of a drive member and a driven member. The connector or joint permits the drive member to be arcuately indexed relative to the driven member without requiring the connector or joint to be disconnected and separated. In many installations, the drive and driven members may be made of a suitable material which will allow the operations to be performed without the use of tools. This is particularly true when the members are normally required to transmit relatively light torques, as for example in the mechanical transmission of instrument settings.

What is claimed is:

1. Mechanism connecting two rotatable members in driving, retaining and indexing relation, said mechanism comprising
    a rotatable drive member having a circumferentially extending groove therein in spaced adjacent relation to one end to define a land between said groove and said end, the outer surface of said land having circumferentially spaced and longitudinally extending splines formed therein,
    a rotatable driven member having a bore in one end and a bore inner wall formed with circumferentially spaced and longitudinally extending splines mating with said land splines in rotating driving relation,
    at least a portion of said driven member including the splined bore inner wall having longitudinal slots therein to provide a plurality of cantilever spring fingers,
    and detent means including said groove and an inwardly extending detent formed on the end of said driven member adjacent said bore wall splines and received in said groove and axially retaining said drive and driven members together,
    said fingers being radially expandable by the application of a predetermined torque on one member relative to the other member and resultant camming action of said splines to index said members angularly in steps defined by the number of splines on said drive member land.

2. A connector comprising a male end section provided with male splines and a groove spaced from the extreme end of said end section by said male splines, and a female end section having internal splines mating with said male splines and a detent on the outer end thereof received in said groove and a plurality of longitudinal slots formed through and beyond said detent and said internal splines to provide cantilever spring fingers permitting snap axial removal and engagement of said detent relative to said groove and spline camming angular indexing of said male splines and said internal splines without removing said detent axially relative to said groove.

3. The connector of claim 2, said internal splines being longitudinally longer than said male splines and the longitudinal width of said groove being greater than the longitudinal width of said detent thereby permitting limited axial relative movement of said male and female end sections.

4. The connector of claim 2, one of said end sections being a rotary drive member and the other of said end sections being a rotary driven member driven thereby, the torque required between said end sections to obtain spline camming angular indexing being substantially greater than the torques normally transmitted between said drive and driven members.

5. The connector of claim 2, one of said end sections being an axially movable drive member and the other of said end sections being an axially driven member driven thereby, the axial force required between said end sections to obtain snap axial removal of said detent relative to said groove being substantially greater than the axial forces normally transmitted between said drive and driven members.

6. The connector of claim 2, said groove having a side adjacent said male splines sloping to provide a cam-like expander for said fingers and cooperating with said detent upon a predetermined relative axial separating force exerted between said male and female sections to expand said detent radially outwardly over said splines to disconnect said sections.

7. A circumferentially indexable rotary drive coupling comprising radially expandable internal first spline means on a first coupling member, external second spline means on a second coupling member mating with said first spline means in rotary driving relation, said second spline means also being cam means for expanding said first spline means out of rotary driving relation with said second spline means upon a predetermined torque exerted between said coupling members and further being a circumferential index for said first coupling member relative to said second coupling member which is arcuately adjustable by expanding said first spline means, said first spline means being formed on the inner wall of an annular cylindrical section of said first coupling member having longitudinally extending slots therethrough whereby some splines are eliminated from said first spline means.

8. The coupling of claim 7, said slots dividing said annular cylindrical section into a plurality of cantilevered spring fingers each having at least one spline of said first spline means thereon, said fingers being movable outwardly by said cam means sufficiently for said first spline means to pass arcuately over said second spline means.

9. A circumferentially indexable rotary drive coupling comprising radially expandable internal first spline means on a first coupling member, external second spline means on a second coupling member mating with said first spline means in rotary driving relation, said second spline means also being cam means for expanding said first spline means out of rotary driving relation with said second spline means upon a predetermined torque exerted between said coupling members and further being a circumferential index for said first coupling member relative to said second coupling member which is arcuately adjustable by expanding said first spline means, said first and second coupling members further having snap detent means for selectively axially attaching and detaching said coupling members.

10. The coupling of claim 9, said detent means including cam surfaces permitting and causing said axial attachment upon a predetermined compressive axial force being exerted between said coupling members with said first and second splined means aligned for mating relation and further permitting and causing axial detachment upon a predetermined tension axial force being exerted between said coupling members when said first and second spline means are in mating relation.

References Cited

UNITED STATES PATENTS

| | | | |
|---|---|---|---|
| 2,441,038 | 5/1948 | Siesel | 64—29 |
| 2,558,158 | 6/1951 | Rock | 64—29 |
| 2,706,388 | 4/1955 | Potgieter | 64—29 |
| 2,861,437 | 11/1958 | Bachman | 64—15 |

FOREIGN PATENTS

| | | |
|---|---|---|
| 884,593 | 12/1961 | Great Britain. |
| 192,567 | 12/1959 | Sweden. |

FRED C. MATTERN, Jr., *Primary Examiner.*

H. C. COE, *Assistant Examiner.*